Sept. 13, 1960 E. G. GOLDSTONE 2,952,577
COMPOSITE CARPET TILES
Filed May 31, 1955 2 Sheets-Sheet 2

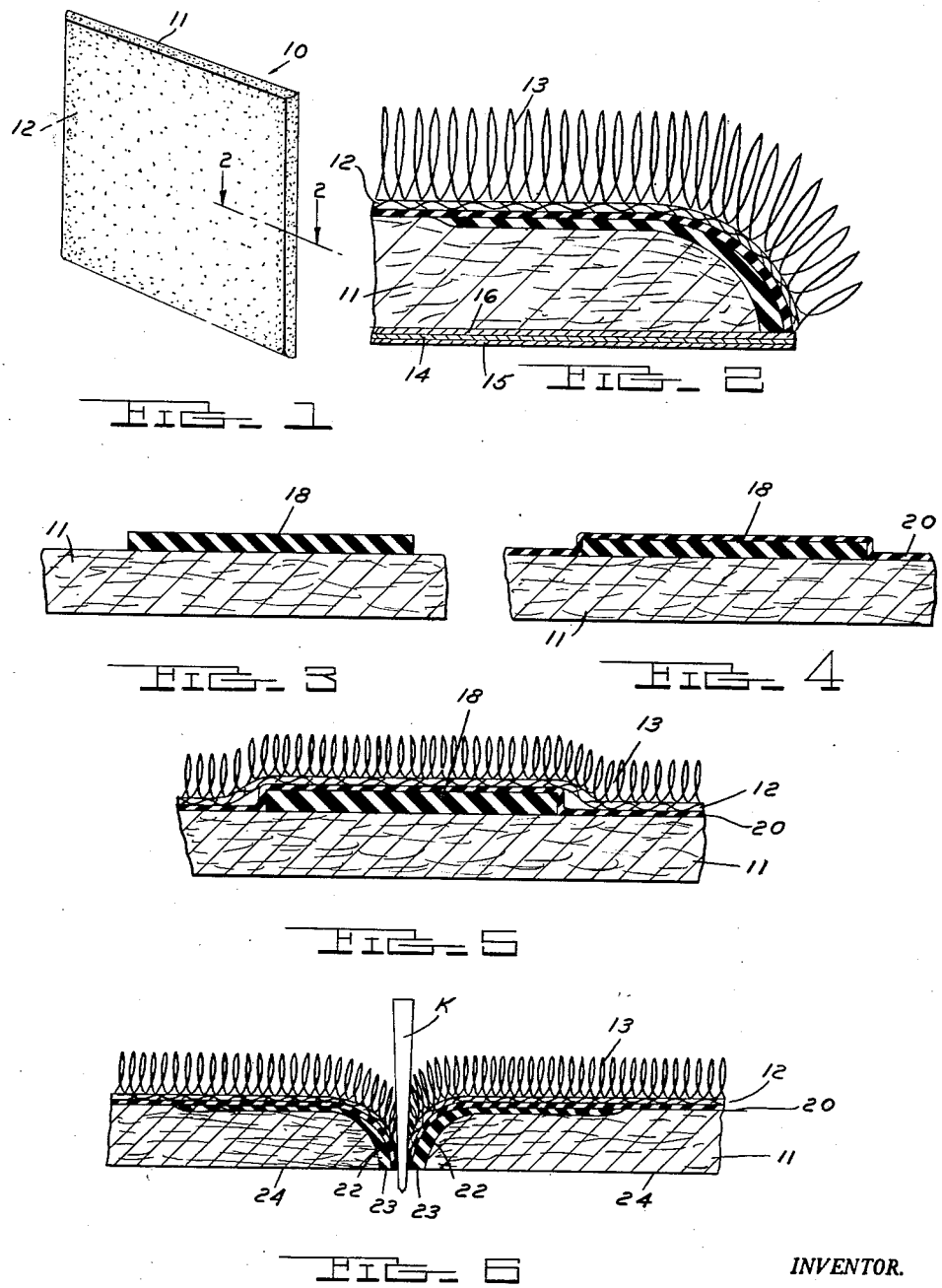

INVENTOR.
EDWARD G. GOLDSTONE
BY
Barnes, Kisselle, Laughlin & Raisch
ATTORNEYS

United States Patent Office 2,952,577
Patented Sept. 13, 1960

2,952,577

COMPOSITE CARPET TILES

Edward G. Goldstone, Huntington Woods, Mich., assignor to Allen Industries Incorporated, Detroit, Mich., a corporation of Delaware Filed May 31, 1955, Ser. No. 512,153

2 Claims. (Cl. 154—49)

This invention relates to a method of making composite fabrics such as carpeting and to products made by the method. A related method and article is disclosed in my copending application Serial No. 500,003, filed April 7, 1955, now abandoned.

The invention can be used in making any composite laminate fabric. An exemplary application of the invention is in making floor covering or carpeting and the invention is especially adapted for making carpet sections or tiles which can be fitted together on a floor to form a complete carpet.

Attempts have been made to secure small rectangular pieces of material together on a floor to form a rug or carpet, but heretofore these attempts have contemplated using the services of skilled workmen utilizing special equipment, thus adding materially to the cost of installed carpeting.

I have heretofore proposed to provide small carpet sections or tiles which carry their own padding or underlayer and which can be fitted side by side on a floor to form a carpet without the necessity of special skills or equipment. A problem existed in providing a satisfactory binding to prevent the edges of such carpet tiles from fraying. One of my attempts was to bind the edges with cloth strips or tapes, but this created unsightly lines or interruptions in the nap or piling at the joints between the tiles. Another of my attempts was to coat the edges of the tiles with a cement, but this method was generally inadequate to prevent fraying and was not completely satisfactory where the underlayment comprised a loosely matted, fibrous material, the fibers often tending to pull out of the edges of the tiles during vacuum cleaning.

An object of this invention is to provide a simple, inexpensive method of making carpeting, and carpet tiles in particular, which can be fitted together in generally invisible butt joints and which have tightly sealed edges so that the materials thereof will remain intact during normal use and during vacuum cleaning.

The invention is carried out generally by assembling a layer of wearing material and a layer of underlay material in laminate relation with interposed strips of cohesive latex, and shearing the materials along the latex strips in a direction normal to the plane of the layers so that portions of the layers adjacent the edges formed by the shearing are compressed into the latex. The latex is allowed to cure completely to form a selvage edge having a matrix of rubber for locking the materials securely in place. One form of the invention is illustrated in the accompanying drawings:

Fig. 1 is a perspective view of a carpet tile according to this invention.

Fig. 2 is an enlarged, generally diagrammatic sectional view on line 2—2 of Fig. 1.

Fig. 3 is a diagrammatic illustration of an initial step in the method of this invention.

Fig. 4 is a diagrammatic illustration of a subsequent step in the method.

Fig. 5 is a diagrammatic illustration of a further subsequent step in the method.

Fig. 6 is a diagrammatic illustration of the shearing step.

Figure 7:
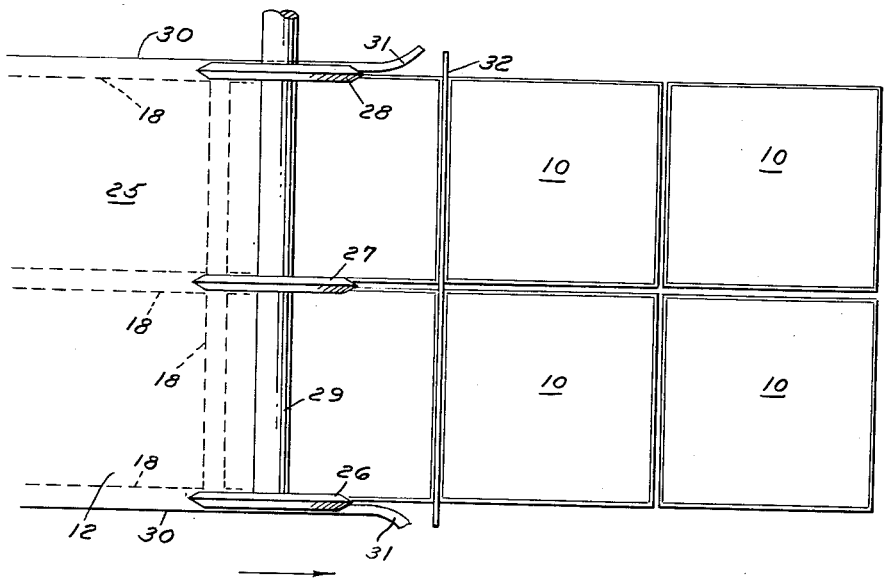
Fig. 7 is a diagrammatic representation of apparatus for carrying out the shearing step.

Shown in the drawings is a carpet section or tile 10 according to this invention and comprising a layer of backing material or underlayer 11 such as a non-woven, loosely matted, fibrous body of jute or the like with a layer of wearing or surfacing material 12 secured thereon and having piling or nap 13 as shown. The bottom side of the tile is treated with a sizing material such as neoprene, starch or a vegetable sizing which penetrates underlayment 11 sufficiently to provide form retaining body 16 and a receiving surface for a pressure sensitive or adhesive cement 14 adapted to adhere to a flooring. The adhesive is protected prior to use by a layer 15 of material such as paper (Fig. 2).

To make carpet tiles 10, strips 18 of latex or an aqueous dispersion of rubber are laid or formed as by spraying on a sheet 11 of unwoven loosely matted fibrous material such as jute (Fig. 3). These strips preferably have reticulate form and are positioned at the ultimate edge portions of the carpet tiles. The strips are shown herein as being laid in a rectangular pattern to form rectangular tiles, as shown, but this may be varied as desired.

A relatively thin film or membrane 20 of imporous latex is laid over entire sheet 11 and strips 18 thereon (Fig. 4). Strips 18 and film 20 are shown separate for the purpose of illustration, but in fact the film welds or fuses with the strips upon contact. After the latex strips and film have partially cured to a cohesive condition, a layer of carpet material or wearing material 12 is placed in laminate relation over sheet 11 (Fig. 5). Strips 18 have substantial thickness as shown but their thickness is exaggerated in Figs. 3–5 for purposes of illustration.

The laminate materials are severed along the lines defined by strips 18 to form separate carpet tiles 10. As shown in Fig. 6, the severing is preferably accomplished by shearing the materials in a direction generally perpendicular to the plane of layers 11 and 12 and in a direction beginning at the top of the materials and progressing toward the bottom. A shearing knife is represented in Fig. 6 at K. During the shearing, top layer 12 is forced downwardly so that the materials of layers 11 and 12 are compressed into latex strips 18. The latex penetrates and welds around the fibers of the two layers.

The portions 22 of strips 18 adjacent knife K are forced downwardly so that the latex together with the materials imbedded therein form the side walls of the resulting carpet square. The extreme edges 23 of the latex strips form portions of the bottoms 24 of the carpet tiles. As a result of the shearing and compressing action of knife K, side walls 22 have taper thickness, being thickest at their bases 23 and being thinner adjacent the top portion of fibrous underlayment 11.

When the latex in side walls 22 cures completely it forms a salvage edge having a matrix of rubber securely locking the materials of underlay 11 and fabric 12 in place. During the shearing step the central portions of wearing material 12 are pulled downwardly somewhat so that the lower face thereof and the upper face portions of underlayer 11 are forced against cohesive membrane 20. When this membrane cures completely it forms a layer of rubber bonding central portions of the underlayer and wearing material together.

One form of apparatus for performing the shearing step is represented generally in Fig. 7. A sheet 25 of laminated materials having the structure illustrated in Fig. 5 is passed by a suitable conveyor (not shown) to a group of rotary knives 26, 27 and 28 mounted on a shaft 29 extending transversely of the directiaon of travel of the sheet. Outer knives 26 and 28 shear sheet 25 along the longitudinal latex strips adjacent sides 30, severing strips 31 therefrom. Central knife 27 shears sheet 25 along the central, longitudinally extending latex strip 18.

Sheet 25 is then passed to a transversely extending knife 32 which severs the sheet along transverse latex strips 18 to form separate carpet squares or tiles 10. If desired, the shearing apparatus may comprise a rectangular die formed of a number of cooperating knives K. Carpet tiles of various sizes and shapes may be formed by arranging latex strips 18 in various patterns and arranging the knives to sever laminate sheet 25 along the strips.

The terms "latex," "aqueous dispersions of rubber," and "rubber" as used in the specification and claims are intended to cover both natural and synthetic materials, as well as compounds or mixtures of natural or synthetic lattices with other ingredients which may be added to impart stability, fluidity, viscosity and other desirable features to the membranes and films, provided that the resultant material is cohesive and has the property of self-adhesion.

Figure 8:
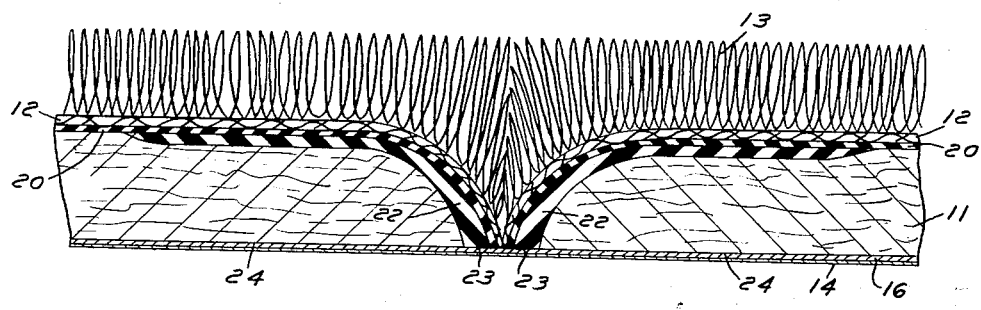
Fig. 8 is a diagrammatic sectional view illustrating the relation between adjacent carpet tiles assembled on a floor.

In use, to lay a tile 10, paper cover 15 is stripped away from adhesive 14 and the tile is laid in place on a floor, the tile being secured into position by adhesion of coating 14 to the floor. A carpet is formed by laying a number of tiles in snugly abutting relation on the floor as illustrated in Fig. 8. The tiles can be laid conveniently by any one having ordinary manual ability without the necessity of special tools, equipment or skills so that the cost of carpet installation is reduced to little or nothing.

The depressed or downwardly curved edge portions of the tiles are relatively narrow and I have found that upon installation and subsequent use the nap or piling 13 on the wearing surface of the carpet fills in the edge depressions and cancels the joints between the tiles. The fibrous underlayer 11 provides adequate padding or backing for the wearing material 12 and the rubber lock or matrix along the edges of the tiles secures the fibrous material of the underlayer firmly in place so that it cannot be worked out in normal use and cannot be sucked out during vacuum cleaning. Rubber film 20 bonds the wearing material to the underlayment to prevent it from creeping or being sucked up unduly during vacuum cleaning.

Rugs or carpets of various shapes may be formed from the tiles to fit irregularly shaped rooms. The adhesive is integral with the tiles and of such permanent tackiness that the carpet may be taken up, for example upon moving, by merely stripping the tiles off of the floor. The tiles may subsequently be laid in another room and may be arranged according to the shape thereof. Carpeting subjected to greater wear, such as adjacent doors, may be replaced by merely removing the worn carpet tiles and replacing them with new tiles. Various parts of a carpet may be rearranged periodically to subject all parts of a carpet to equal amounts of wear.

Thus it is seen that this invention provides a simple, inexpensive method of making carpet tiles which can be fitted together in place by a layman to form a complete rug or carpet of any desired shape with the joints between adjacent tiles being largely invisible. The tiles are constructed to withstand all normal wear and their edge portions are sealed to prevent disturbance of the fibers and materials thereof during cleaning. The entire carpet or portions thereof may be taken up and replaced or moved as desired.

I claim:

1. A carpet tile of a size conveniently lifted with one hand, comprising, in laminated relationship, an upper layer of pile fabric having upwardly directed pile, an intermediate layer of imporous latex and a relatively thick bottom layer of non-woven, loosely matter, fibrous material, said tile including selvage edges surrounding a central portion, said latex layer being a continuous body much thicker at said selvage edges than at said central portion, said layer of fibrous material being embedded in said latex body to the extent of its thickness both at said edges and said central portion and said selvage portions being compressed and held by said latex with said pile fabric covering the edges of said fibrous materials whereby some of the pile at said edges extends in a direction having a substantial horizontal component.

2. A carpet tile as set forth in claim 1 wherein the underside of said fibrous material is provided with a pressure-sensitive adhesive covering all portions thereof.

References Cited in the file of this patent

UNITED STATES PATENTS

| | | |
|---|---|---|
| 1,947,152 | Clark | Feb. 13, 1934 |
| 2,012,929 | Knowland | Aug. 27, 1935 |
| 2,016,876 | Stolzenberg | Oct. 8, 1935 |
| 2,217,137 | Roth et al. | Oct. 8, 1940 |
| 2,303,198 | Cunnington | Nov. 24, 1942 |
| 2,515,847 | Winkler | July 18, 1950 |
| 2,517,389 | Dow et al. | Aug. 1, 1950 |
| 2,529,799 | Crockett | Nov. 14, 1950 |
| 2,567,951 | Lewis | Sept. 18, 1951 |
| 2,585,108 | Gordon | Feb. 12, 1952 |
| 2,709,668 | Thompson | May 31, 1955 |
| 2,723,937 | Rice | Nov. 15, 1955 |
| 2,760,895 | Holgerson | Aug. 28, 1956 |
| 2,763,587 | Masland | Sept. 18, 1956 |

FOREIGN PATENTS

| | | |
|---|---|---|
| 465,518 | Great Britain | May 3, 1937 |